United States Patent

Timmons

[11] Patent Number: 5,529,698
[45] Date of Patent: Jun. 25, 1996

[54] SEPARATORS

[75] Inventor: Alban Timmons, Beverley, Great Britain

[73] Assignee: The Clean Water Company Limited, Great Britain

[21] Appl. No.: 232,037
[22] PCT Filed: Nov. 4, 1992
[86] PCT No.: PCT/GB92/02035
§ 371 Date: Apr. 26, 1994
§ 102(e) Date: Apr. 26, 1994
[87] PCT Pub. No.: WO93/08892
PCT Pub. Date: May 13, 1993

[30] Foreign Application Priority Data

Nov. 6, 1991 [GB] United Kingdom ............. 9123566

[51] Int. Cl.⁶ ............................. C02F 1/52; C02F 1/38
[52] U.S. Cl. .................. 210/723; 210/512.1; 210/787; 210/788
[58] Field of Search ................... 210/787, 788, 210/723, 512.1

[56] References Cited

U.S. PATENT DOCUMENTS

| | | | |
|---|---|---|---|
| 3,788,469 | 1/1974 | Hirsch et al. | 210/788 |
| 3,989,628 | 11/1976 | Bier | 210/788 |
| 4,146,468 | 3/1979 | Wilson | 210/788 |
| 4,278,550 | 7/1981 | Watts | 210/788 |
| 4,855,065 | 8/1989 | Keeter et al. | 210/788 |
| 4,863,617 | 9/1989 | Katoh et al. | 210/788 |
| 5,082,560 | 1/1992 | Eli et al. | 210/788 |
| 5,368,747 | 11/1994 | Rymal, Jr. et al. | 210/788 |

*Primary Examiner*—Neil McCarthy
*Attorney, Agent, or Firm*—William A. Drucker

[57] ABSTRACT

A method of, and apparatus for, separating contaminants from a base liquid and whereby the contaminated base liquid is passed through a pretreatment vessel before being passed to a conventional separator. In one embodiment, the pretreatment vessel is of generally cylindrical form arranged with its axis substantially vertical. Base liquid to be decontaminated is supplied into the mid-height regions of the vessel through a tangential device to cause circulating flows within the vessel. The vessel includes an outlet in its top region for the release of light contaminants, an outlet in its lower region for the release of heavy contaminants and an outlet duct in its mid-region, spaced from the inlet, for releasing partially contaminated liquid from the vessel for release into a conventional separator. Preferably the method includes the steps of introducing a first treatment material to the base liquid before, or as, the base liquid enters the vessel and adding a second treatment material into the partially decontaminated base liquid to be directed to the conventional separator.

10 Claims, 1 Drawing Sheet

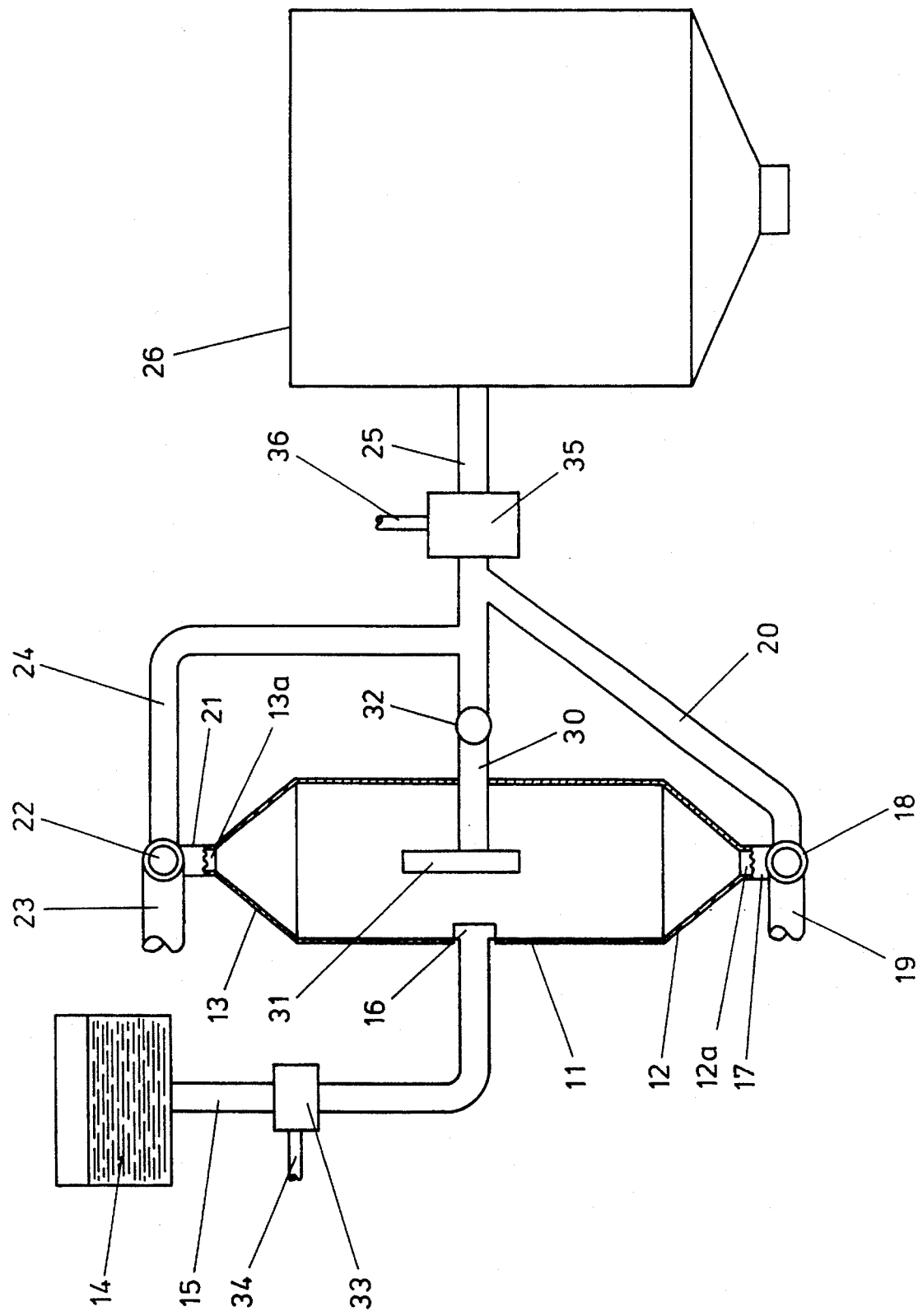

SEPARATORS

This invention relates to separators and, more particularly, to separates for separating particulate solids and semi-solids contaminants from a base liquid.

Separators for separating particulate solids and semi-solids contaminants from a base liquid are well known in the art and in one form comprises a generally cylindrical vessel, arranged with its axis substantially vertical, a conical bottom closing the lower regions of the vessel and a top or roof closing the upper regions of the vessel. The vessel includes an outlet for "heavy" contaminants, that is to say contaminants having a specific gravity greater than the specific gravity of the base liquid, in the lower regions of said bottom and from which the heavy contaminants are continuously extracted, an outlet for "light" contaminants, that is to say contaminants having a specific gravity less than the specific gravity of the base liquid, in the upper regions of the vessel and from which light contaminants are continuously extracted and an outlet for de-contaminated liquid in the upper regions of the vessel from which de-contaminated liquid is continuously extracted.

The contaminated liquid is supplied into the vessel tangentially through a side opening and the tangential entry of the contaminated base liquid generates circulating flows within the vessel, which induce laminar flows to assist in the vertical displacement of the contaminants within the vessel.

This form of separator, hereinafter referred to as a separator of the type defined, is well known in the art and the construction and method of operation are known in such detail, as for example from British Patent Publication No.2205512 and British Patent Publication No. 2158741, that no further description of the separator, or its mode of operation, is required herein.

Separators of the type defined work efficiently only within relatively close limits, wherein the rates of flow of contaminated base liquid into the vessel and through the outlets from the vessel are substantially constant and the residence time of the contaminants in the separator is sufficient for said contaminants to fall or rise towards their respective outlets and thereby out of the flows to the decontaminated liquid outlet.

A serious problem with separators of the type defined arises when the contaminated base liquid is very heavily contaminated with light or heavy contaminants, when the relevant contaminants outlet(s) may be inadequate for dealing with the excessive volume of contaminants to be removed and become choked with contaminants. If, because of a complete or partial blockage, the rate of flow through a contaminants outlet should be reduced, the flow system throughout the separator will change and contaminants will be carried up the spiralling flows in the upper central regions of the vessel and will be carried over with the de-contaminated liquid.

This problem is particularly acute when the contaminant contents of the contaminated base liquid is variable.

It has been proposed that this problem may be overcome by arranging two separators of the type defined in series, whereby the partially de-contaminated liquid from the first separator is supplied to the second separator, but this solution simply means that the first separator is subjected to the overload conditions defined above and, even if the first separator is able to cope with the contaminants, the varying volume of contaminants removed in the first separator can vary the rate of flow of the partially de-contaminated liquid flowing to the second separator and will thereby adversely affect the efficiency of that separator.

It is well known in the art to add treatment materials to a contaminated base liquid, to chemically change one or more of said contaminants or to cause flocculation of contaminants, to facilitate removal of the treated contaminates but, to be effective, such treatment materials must be intimately mixed throughout the base liquid and the flows within a separator of the type defined are too slow to effect the required distribution of a treatment material injected into the vessel.

A further problem is that the treatment materials often require a time period in order to effectively react with the contaminants and, as in separators of the type defined the greater part of the contaminants are removed, or are committed to removal, in the early part of the entry of the contaminated liquid into the separator, the residence time of the base liquid in a separator of the type defined is inadequate for most treatment materials to be effective on the contaminants and for the separator to effectively separate the treated contaminants from the base liquid.

The present invention seeks to provide a method for separating contaminants from a base liquid and which is more efficacious than the known methods of separating.

According to the present invention there is provided a method for separating contaminants from a base liquid comprising the steps of supplying contaminated base liquid an a substantially uniform rate to a pre-treatment vessel in a manner to cause circulating flows within said vessel, treating said contaminated base liquid with a chemical treatment material, allowing the treated contaminated base liquid to flow from the vessel through an outlet so spaced from the inlet for the contaminated liquid, in the direction of said circulating flows, that the chemically treated contaminated base liquid flowing through said outlet has spent at least a predetermined time in said vessel and passing the treated contaminated base liquid to a separator of the type defined.

Preferably the method includes the steps of introducing the contaminated base liquid tangentially into the said pre-treatment vessel.

In one embodiment the method is characterised by the steps of reducing flows in said vessel to concentrate at least part of the contaminants in one part of the vessel, continuously extracting the concentration of contaminants from said vessel, allowing chemically treated partially decontaminated base liquid to flow from the vessel through an outlet spaced from that part of the vessel in which contaminants are concentrated and passing the chemically treated partially de-contaminated base liquid to the separator of the type defined.

In one embodiment the method is characterised by the steps of arranging an outlet through which heavy contaminants can be extracted in the lower regions of the vessel and arranging the outlet for the chemically treated partially de-contaminated base liquid in the upper regions of said vessel.

In another embodiment the method is characterised by the steps of arranging an outlet through which light contaminants can be extracted in the upper regions of the vessel and arranging the outlet for the chemically treated partially de-contaminated base liquid in the lower regions of said vessel.

Preferably the method is characterised by the step of arranging an outlet through which light contaminants can be extracted in the upper regions of the vessel, arranging an outlet through which heavy contaminants can be extracted in the lower regions of the vessel and arranging the outlet for the chemically treated partially de-contaminated base liquid to open into the mid-height region of the vessel.

In such an embodiment the method preferably includes the steps of arranging the outlet for the chemically treated partially de-contaminated base liquid to open adjacent the central axis of the said vessel.

Preferably the method is characterised by the steps of introducing the chemical treatment material into the contaminated base liquid whilst said liquid is in said vessel.

Preferably the method is characterised by the steps of introducing the treatment material into the contaminated base liquid before said contaminated base liquid is passed into said vessel.

In one embodiment the method is characterised by the steps of selecting said chemical treatment material from the group comprising ferric salts, (sulphate or chloride), aluminium sulphates, lime, lime carbonate, caustic soda or any other of the materials for chemically changing or flocculating contaminants.

In a preferred embodiment the method is characterised by the steps of introducing a second chemical treatment material into the partially de-contaminated base liquid being supplied to the separator of the type defined.

Preferably the method is characterised by the steps of selecting the second treatment material to comprise a polymer material intended to cause a reaction of the contaminants in the contaminated base liquid, after intimate mixing with the first treatment material.

The invention also envisages apparatus comprising a separator of the type defined in combination with a pre-treatment vessel, characterised by means for supplying contaminated base liquid to said pre-treatment vessel, means for adding a chemical treatment material to the contaminated base liquid, means for generating circulating flows in the chemically treated contaminated base liquid in said pre-treatment vessel and means for supplying chemically treated contaminated base liquid from said pre-treatment vessel to the separator of the type defined.

Preferably the apparatus is characterised in that the pre-treatment vessel comprises a substantially cylindrical vessel arranged with its axis substantially vertical.

In one embodiment the apparatus is characterised by means for removing heavy contaminants from the lower regions of the vessel and means for extracting chemically treated partially de-contaminated base liquid from the upper regions of the vessel.

In another embodiment the apparatus includes means for extracting light contaminants from an upper region of the vessel and means for extracting chemically treated partially de-contaminated liquid from the lower regions of the vessel.

Preferably the apparatus is characterised by means for extracting light contaminants from the upper regions of the vessel, means for removing heavy contaminants from the lower regions of the vessel and means for removing chemically treated contaminated base liquid from a mid-height region of the pre-treatment vessel.

Preferably the apparatus includes means for introducing the chemical treatment material into the contaminated base liquid being supplied to said pre-treatment vessel.

In one embodiment the apparatus is characterised by means for mixing the said chemical treatment material into said contaminated base liquid.

Preferably the apparatus is characterised by means for mixing a second treatment material into the chemically treated base liquid being supplied from said pre-treatment vessel to said separator.

In one embodiment the apparatus is characterised in that said means for mixing comprise a hydro-brake mixing device.

The invention will now be described further by way of example with reference to the accompanying drawings in which the single FIGURE shows, diagramatically and partially in cross-section, a separator arrangement in accordance with the invention.

In the illustrated embodiment a pre-treatment vessel 11, of generally cylindrical form, is arranged with its central axis substantially vertically, the lower regions of the vessel are defined by a conical bottom 12 and the upper regions of the vessel are defined by a conical top 13. A central aperture 12a in the bottom 12 defines an outlet for heavy contaminants and a central outer 13a, in the top 13, defines an outlet for light contaminants.

The vessel 11 is supplied with contaminated base Liquid from a header tank 14 which discharges via a duct 15. The duct 15 opens into the mid-height region of the vessel 11 and, via a tangential flow device 16, the liquid from duct 15 is discharged tangentially into the vessel 11 to generate circulating flow therein.

Tangential devices 16 are well known in the art and are described in derail in, for example, the British Patent Publications referred to hereinbefore and, accordingly, no further description thereof is necessary.

With the tangential device 16 generating circulating flows about the central axis of the vessel 11, and which circulating flows essentially develop laminar flows in the liquid, heavy contaminants in the liquid are allowed to fall under gravity to the bottom 12 and light contaminants flow upwardly within the vessel to the top 13.

The aperture 12a in the bottom 12 of the vessel 11 opens to a flow passage 17, which connects with a valve 18. The valve 18, when in one position, ducts liquid from the flow passage 17 to a duct 19, which leads to an exhaust. In its other position the valve 18 ducts liquid from the flow passage 17 to a duct 20.

In like manner the aperture 13a in the top 13 is open to a flow passage 21 which extends to a valve 22. The valve 22, in one position, ducts the liquid from flow passage 21 to a duct 23, extending to an exhaust, and in another position a valve 22 ducts liquid from flow passage 21 to a duct 24.

The ducts 20 and 24 extend to, and open into, a common duct 25, which constitutes the inlet duct to a separator of the type defined 26.

In one mode for operating the apparatus described thus far, and when a contaminated base liquid to be processed include a large volume of heavy contaminants, the valve 18 is set to duct all the flows from flow passage 17 through to duct 19. At the same time the valve 22 is so positioned that flows from flow passage 21 to duct 23 are closed and all the flows from flow passage 21 are directed through the valve 22 to duct 24.

With the valves 18 and 22 so set, and with the vessel 11 charged with contaminated liquid, and heavily contaminated liquid entering the vessel 11 via the duct 15 and tangential device 16, the greater part of the heavy contaminants entering the vessel 11 fall rapidly down the vessel 11 to the conical bottom 12, down the sloping wall of conical bottom 12 into the flow passage 17 and to exhaust, via the duct 19. The partially de-contaminated liquid, perhaps with some small part of the heavy contaminants as may be carried upwardly in the vessel 11 and with the light contaminates, flows through the flow passage 21 to the duct 24 and, therefrom, via duct 25 into the separator 26.

Thus, by this mode of operating the pre-treatment vessel 11, the greater part of the heavy contaminants are removed from the contaminated liquid before said liquid is passed into the conventional separator 26.

In another mode of operation, when the contaminated liquid includes a large volume of light contaminants, the valve 22 is positioned to duct liquid from the flow passage 21 to the exhaust duct 23, and the valve 18 is set to open the flow passage 17 to the duct 20.

Thus, in this mode of operation, the light contaminants entering the vessel 11 are allowed to flow upwardly within the vessel 11 and therefrom through the aperture 13 to flow passage 21 and through the valve 22 to the exhaust duct 23. At the same time partially de-contaminated liquid, with the heavy contaminants and perhaps some part of the light contaminants, flows through aperture 12a, through flow passage 17, through the valve 18, and along the duct 20 to the duct 25.

In another mode of operation, intended for use when the contaminated liquid contains large volumes of both heavy and light contaminants, the vessel is modified to include a duct 30, which extends from the duct 25, through the wall of the vessel 11 and terminates in a vertical duct 31, open at both ends and having its axis concentric with the axis of the vessel 11. the upper open end of the duct 31 lies above the horizontal plane passing through tangential device 16 and the lower open end of the duct 31 lies below said plane. The duct 30 conveniently includes a valve 32.

In operating the apparatus in this mode, the valve 18 is positioned to discharge all the heavy contaminants falling through the aperture 12a to the exhaust 19, the valve 22 is positioned to discharge all the light contaminants rising through the aperture 13a to exhaust 23 and the partially de-contaminated liquid is taken off through the duct 31, the duct 30, and through the valve 32 to the duct 25 supplying the separator 26.

It will be appreciated that when the liquid has a large volume of light or heavy contaminants the flow rates through the relevant contaminants flow passage 17 or 21 will be controlled so that the maximum volume of contaminants with the minimum volume of liquid is passed to exhaust It will be observed that in all the above described embodiments the contaminated liquid is supplied to the vessel under a substantially constant hydraulic head and with the cross sectional area of the duct 15 greater than the sum of the cross-sectional areas of all the outlets 12a, 13a and 31, a substantially uniform supply of partially contaminated liquid to the separator is obtained.

The separator apparatus as illustrated also includes a mixing device 33, for example a hydro-brake device, in the supply conduit 15 and by way of which a treatment material may be added to the contaminated liquid via a duct 34. Thus, the treatment material can be continuously added to the contaminated liquid and intimately mixed therewith in the device 33. The mixing and distribution of the treatment material through the contaminated liquid will continue as the liquid passes into and through the vessel 11 and the residence time of the treated liquid in the vessel 11 will allow the treatment material to be effective on the liquid and/or the contaminants in the liquid, before the treated liquid is passed to the separator 26.

Treatment materials which may advantageously be used as flocculation/collection agents conveniently comprises ferric salts, (sulphate or chloride), aluminium sulphates, lime, lime carbonate, caustic soda, or any other of the materials for chemically changing or flocculating contaminants well known in the art.

The apparatus preferably also includes a further hydro-brake 35, in the duct 20, and via which a second treatment material such as a "fixing" material, i.e. a polymer, may be added to the partially contaminated liquid via a duct 36.

It will now be apparent that the apparatus illustrated allows a pre-treatment material to be added to the contaminated liquid, intimately mixed throughout said material, and afforded a time interval within which to react with the liquid or contaminants in the liquid before the treated liquid is passed to the separator 26 of the type defined, and the apparatus also allows a second treatment material to be introduced into the pre-treatment material to be introduced into, and intimately mixed with, the pre-treated liquid before said liquid is passed to the separator 26.

It will also be apparent that the treatment material aspects of the invention can be practised with or without use of the vessel 11 as a means for removing excessive heavy or light contaminants from the contaminated liquid.

Whilst in the embodiment described above a single multi-purpose, pre-treatment vessel has been described it will be appreciated that the apparatus may include more than one pre-treatment vessel and thus, for certain applications, the apparatus my comprise a first pre-treatment vessel for removing excess heavy contaminants from the liquid, a second pre-treatment vessel for removing excess light contaminants from the partially decontaminated liquid, and a third pre-treatment vessel for chemically treating the liquid before said liquid is passed to the separator 26.

I claim:

1. A method for separating contaminants from a base liquid comprising the steps of:

(a) supplying contaminated base liquid at a substantially uniform rate to a cylindrical pretreatment vessel, arranged with its central axis substantially vertical, in a manner to cause circulating flows within said vessel, said pretreatment vessel comprising a light contaminants outlet through which light contaminants can be extracted in upper regions of the vessel and a heavy contaminants outlet through which heavy contaminants can be extracted in lower regions of the vessel and a mid-height outlet in a mid-height region of the vessel, said mid-height outlet comprising a vertical duct open at both ends and having its axis concentric with the axis of the pretreatment vessel, (b) treating said contaminated base liquid with a chemical treatment material, (c) allowing a chemically treated partially decontaminated base liquid to flow from the vessel through one of said outlets so spaced from an inlet for the contaminated liquid, in a direction of flow circulation, that the chemically treated contaminated base liquid flowing through said outlet has spent at least a desired time period in said vessel, and (d) passing the treated contaminated base liquid to a liquid separator.

2. A method according to claim 1 comprising the steps of introducing the contaminated base liquid tangentially into the said pretreatment vessel.

3. A method according to claim 1 comprising the steps of introducing the treatment material into the contaminated base liquid before said contaminated base liquid is passed into said vessel.

4. A method according to claim 3 comprising the step of selecting said chemical treatment material from the group consisting of ferric sulphate, ferric chloride, aluminum sulphates, lime, lime carbonate and caustic soda.

5. A method according to claim 3 comprising the step of introducing a second chemical treatment material into the partially decontaminated base liquid being supplied to the liquid separator.

6. A method according to claim 5 comprising the steps of selecting the second chemical treatment material to comprise a polymer material which causes a reaction of the contaminants in the contaminated base liquid after intimate mixing with the first chemical treatment material.

7. Apparatus comprising a liquid separator in combination with a pretreatment vessel, said vessel having its central axis arranged substantially vertically and comprising means for adding a chemical treatment material into a contaminated base liquid, means for generating circulating flows in the chemically treated contaminated base liquid and means for supplying chemically treated contaminated base liquid from said pretreatment vessel to the liquid separator, said pretreatment vessel comprising a light contaminants outlet through which light contaminants can be extracted in upper regions of the vessel and a heavy contaminants outlet through which heavy contaminants can be extracted in lower regions of the vessel and a mid-height outlet in a mid-height region of the vessel, said mid-height outlet comprising a vertical duct open at both ends and having its axis concentric with the axis of the pretreatment vessel.

8. Apparatus according to claim 7 comprising means for mixing the said chemical treatment material into said contaminated base liquid.

9. Apparatus according to claim 7 comprising means for mixing a second treatment material into the chemically treated base liquid being supplied from said pretreatment vessel to said liquid separator.

10. Apparatus according to claim 9 comprising a hydrobrake mixing device for mixing the second treatment material into the liquid being supplied to the liquid to the liquid separator.

* * * * *